INVENTOR
KENNETH W. RAREY
BY
Mason, Porter, Diller & Brown
ATTORNEYS

TONE REPRODUCTION IN SCREEN PRINTING

Filed Oct. 20, 1965 4 Sheets-Sheet 2

INVENTOR
KENNETH W. RAREY
BY
Mason, Porter, Diller & Brown
ATTORNEYS

TONE REPRODUCTION IN SCREEN PRINTING
Filed Oct. 20, 1965
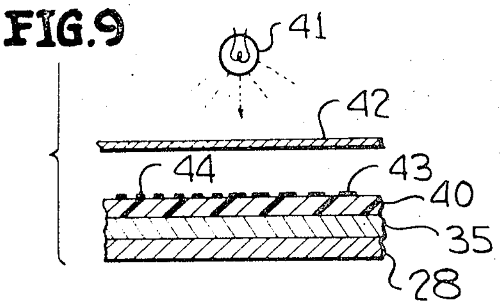
FIG. 9
FIG. 11
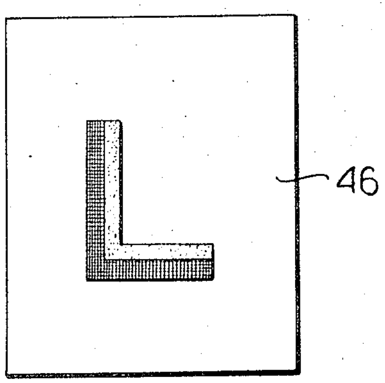
FIG. 10
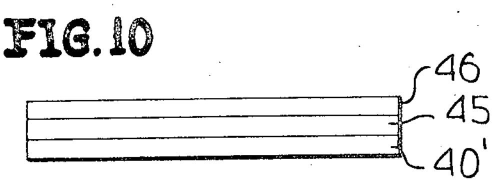
FIG. 12
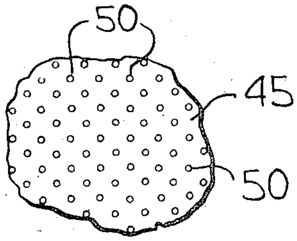
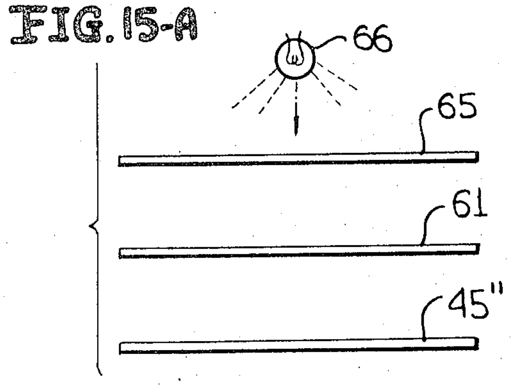
FIG. 15-A
FIG. 13
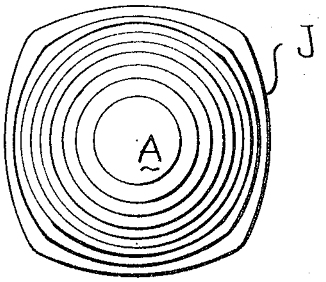
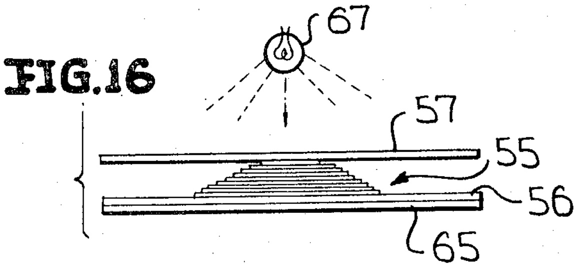
FIG. 16
FIG. 14
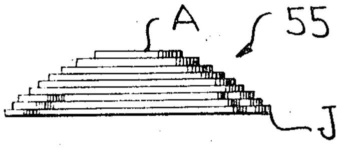
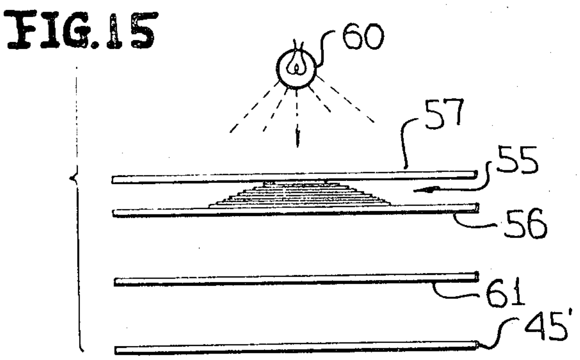
FIG. 15
INVENTOR
KENNETH W. RAREY
BY
Mason, Porter, Diller & Brown
ATTORNEYS INVENTOR
KENNETH W. RAREY
BY
Mason, Porter, Diller & Brown
ATTORNEYS United States Patent Office 3,746,540
Patented July 17, 1973

3,746,540

TONE REPRODUCTION IN SCREEN PRINTING

Kenneth W. Rarey, South Holland, Ill., assignor to Continental Can Company, Inc., New York, N.Y.

Filed Oct. 20, 1965, Ser. No. 498,599
Int. Cl. G03c 5/00
U.S. Cl. 96—36.4 17 Claims

ABSTRACT OF THE DISCLOSURE

A stencil for electrostatic screen reproduction of halftone printing and methods of producing such a stencil including the production of contact screens by novel methods.

This invention relates to tone reproduction in a screen printing process. The invention comprises novel method and apparatus for the reproduction of halftone printing by a screen printing process and more particularly by an electrostatic stencilling process.

A capability of tonal reproduction is a desirable feature for a printing process. Tones are commonly printed by a practice known as the halftone method. Tiny dots, all of the same optical density, are printed on the desired surface. The dots are generally too small to be resolved by the unaided eye when observed from the proper viewing distance. There are typically between 3,000 and 20,000 such dots in each square inch of halftone printing in newspapers, magazines and small signs, such as are frequently encountered. In a given print, the number of dots per unit of area is constant, and different tones are produced by a difference in dot size. When an area printed with such dots is observed, the viewer perceives a tone, the brightness of which is a function of many variables. These include its illumination, the characteristics of the surroundings, the optical properties of the substrate, the ink used for printing the dots, etc. The primary variable used for producing tones of different brightness in a given print, though, is the area of the dots relative to the area of the substrate over which they are distributed. For tones printed with a black toner that are to be high in brightness, i.e., light grays, the dots have a circular shape. They are dots whose total area may occupy up to about 30% of the area over which they are distributed. For tones of little brightness, i.e., the dark grays, an area is printed solidly with the exception of perforations in the image through which the substrate may be observed. These perforations are of comparable size and shape to the dots printed for producing the light tones. Thus, the dots associated with the light and dark tones are the inverse of each other with regard to that which is printed and that which is not. When 50% of the area is printed, the dots generally form a checkerboard pattern. The dots are now square in shape, and each is surrounded by squares of exposed substrate of identical size, and vice versa. The small circular dot of a light tone evolves in size and shape into the larger, square shape of the checkerboard dot as one progresses toward the middle tones. The evolution of the dot as one progresses further along the gray scale is such that the exposed substrate experiences an inverse evolution to that of the dot during the previously considered portion of the tonal range.

As previously observed, the number of dots per unit of area is the same throughout the range of tones. The specific number per unit area is selected on the basis of the pattern to be printed, the viewing distance, the surface to be printed, the method of printing, etc.

When an area printed in such a manner is observed, the tone that is perceived is synthesized from the combination of printed and unprinted regions. Since these printed and unprinted regions are not generally resolved, such an area is perceived as if it had a single optical reflection coefficient throughout its extent. If a halftone printed area reflects illuminating radiation the same as an area which is uniform, they are perceived as having substantially the same tone.

Printing plates can be prepared to print halftones patterns; this is the common method of reproducing tones. However, a halftone pattern of a complete gray scale, from white to black through the intermediate tones, could not heretofore be free-standing, i.e., self-supporting. Thus, printing methods such as letter press, lithography, gravure and screen printing (utilizing a supporting screen) are used to reproduce such patterns, but not simple stencilling.

Accordingly, it is an object of this invention to provide a stencil for halftone printing wherein the stencil comprises a sheet of material having apertures therethrough, the apertures being spaced to provide a fixed number of apertures per unit of linear measure, and some of the apertures differing from other apertures both in size and in shape.

Another object of this invention is to provide such a stencil wherein the apertures have a continuous border which define openings capable of allowing passage therethrough of printing particles having an average diameter between 1 and 25 microns.

Another object of this invention is to provide a self-supporting stencil for halftone printing without the use of a conventional supporting screen, the stencil comprising a sheet of material having apertures therethrough, the apertures varying in size and shape and corresponding in size and shape to that of some conventional halftone printing dots.

Another object of this invention is to provide a self-supporting stencil for use in an electrostatic screen printing apparatus for producing halftone prints, the stencil consisting of a sheet of electrically conductive material having apertures therethrough spaced to provide a fixed number of apertures per unit of linear measure, the apertures having a continuous border and varying in size and shape to produce a desired pattern.

Another object of this invention is to provide a new and novel contact screen, or filter, which is useful in producing the aforementioned stencil. The contact screen comprises a transparent sheet, a pattern of symmetrically located dots on said transparent sheet, each of the dots being comprised of a central portion in the form of a dot and a series of annular portions of increasing peripheries surrounding the dot, the dot having a continuous tone optical density, each annular portion of the series of annular portions having a continuous tone optical density, and the optical density of the dot and the respective optical densities of the annular portions varying so as to provide the dots with a stepped gradation of shading extending outwardly from the dot.

Another object of the present invention is to provide such a contact screen wherein the optical density of the dot and the optical densities of the annular portions increase from the central portion of the dot to the outermost annular portion thereof.

Another object of this invention is to provide such a contact screen wherein the optical density of the dot and the optical densities of the annular portions decrease from the central portion of the dot to the outermost annular portion thereof.

Another object of this invention is to provide a new and novel method of making a stencil for halftone printing, the method comprising the steps of selecting an etchable material for the stencil, coating the material with an appropriate photoresist; making a continuous tone transparency of the artwork which is to be reproduced, making a halftone transparency using the continuous tone transparency of the artwork and a specially prepared halftone contact screen, as referred to above; making an exposure on the photoresist coated material, and processing and etching the exposed photoresist coated material.

Another object of this invention is to provide a method of making a stencil for halftone printing, the method comprising the steps of selecting an etchable material for the stencil, coating the material with an appropriate photoresist; making a continuous tone transparency of the artwork which is to be reproduced, making an exposure on the photoresist coated material by using the continuous tone transparency of the artwork and a specially prepared halftone contact screen, and processing and etching the exposed photoresist coated material.

Another object of this invention is to provide a method of making a stencil for halftone printing, the method comprising the steps of selecting an etchable material for the stencil, and coating the material with an appropriate photoresist; making continuous tone transparency of the artwork which is to be reproduced; making a contact screen comprising a transparent sheet having a pattern of symmetrically located spots thereon wherein each of the spots is comprised of a central portion in the form of a dot and a series of annular portions of increasing peripheries surrounding the dot; making a halftone transparency using the continuous tone transparency of the artwork and the contact screen; making an exposure on the photoresist coated material, and processing and etching the exposed photoresist coated material.

Another object of this invention is to provide a new and novel method of making a contact screen which is utilized in the aforementioned method of making a stencil for halftone printing. The method of making a contact screen comprises the steps of superimposing a plurality of dot patterns of varying shapes so as to form a unit cell, creating a multiple series of images of the unit cell on photosensitive material, and developing the photosensitive material.

Another object of this invention is to provide a method of making a contact screen comprising the steps of superimposing a plurality of varying dot shapes in registered alignment so as to form a unit cell, creating images of the unit cell on photosensitive material, developing the photosensitive material to produce a contact screen having a pattern of dots thereon wherein each dot has a gradation of shading from its central portion to the periphery thereof.

Another object of this invention is to provide a method of making a contact screen comprising the steps of uniformly exposing and developing sheets of film to obtain uniform sheets of predetermined optical densities, forming a series of different dot shapes from the sheets of film, superimposing the different dot shapes to form a unit cell, forming a continuous tone transparency of the unit cell, exposing a wide-latitude film with a series of images of the continuous tone transparency, and developing the wide-latitude film to produce the contact screen.

Another object of this invention is to provide a method of making a contact screen comprising the steps of uniformly exposing and developing sheets of film to obtain uniform sheets of predetermined optical densities, forming a series of different dot shapes from the sheets of film, superimposing the different dot shapes to form a unit cell, disposing the unit cell between sheets of transparent glass to maintain the unit cell in location, forming a negative continuous tone transparency using the unit cell as the object, then exposing a wide-latitude film with a series of images by using a multiple-pinhole camera obscura and the negative continuous tone transparency as the object, and developing the wide-latitude film to produce the contact screen.

Another object of this invention is to provide a new and novel continuous tone transparency, for use in making the aforementioned contact screen, wherein the transparency comprises a sheet of developed film having an image formed thereon, the image being comprised of a central portion in the form of a dot, the dot being surrounded by a series of annular portions of increasing peripheries, the dot having a continuous tone optical density, each annular portion of the series of annular portions having a continuous tone optical density, and the optical density of the dot and the respective optical densities of the annular portions varying so as to provide the image with a stepped gradation of shading extending outwardly from the dot.

Another object of this invention is to provide a transparency, of the type set forth above, wherein the optical density of the dot and the optical densities of the annular portions increase from the central portion of the image to the outermost annular portion thereof.

Another object of this invention is to provide a transparency, of the type described above, wherein the optical density of the dot and the optical densities of the annular portions decrease from the central portion of the image to the outermost annular portion thereof.

Another object of this invention is to provide a new and novel unit cell which is utilized in making a continuous tone transparency for use in producing a contact screen. The unit cell comprises a series of superimposed layers of halftone dots of varying shapes, each of the layers being comprised of a sheet of translucent material of individually constant optical density.

Another object of this invention is to provide a unit cell, of the type described above, wherein each sheet of translucent material has the same optical density.

A further object of this invention is to provide a unit cell, of the type set forth above, wherein each sheet of translucent material has an optical density which is different from the optical density of a sheet forming an adjacent layer of the unit cell.

Another object of this invention is to provide an alternative method of making a stencil for halftone printing, the method comprising the steps of selecting an etchable material for the stencil, coating the material with an appropriate photoresist; making a continuous tone transparency, with gamma equal to less than one, of the artwork which is to be reproduced; making an exposure on the photoresist coated material by using the continuous tone transparency of the artwork and a halftone contact screen, and processing and etching the exposed photoresist coated material.

Another object of this invention is to provide a method of the type described above wherein the continuous tone transparency is a negative of the artwork.

A further object of this invention is to provide a method of making a stencil for halftone printing, the method comprising the steps of selecting an etchable material for the stencil, coating the material with an appropriate photoresist; making a continuous tone transparency, with gamma equal to less than one, of the artwork which is to be reproduced; making a halftone transparency using the continuous tone transparency of the artwork and a halftone contact screen; making an exposure on the photoresist coated material, and processing and etching the exposed photoresist coated material.

A still further object of this invention is to provide a method of the type described above wherein the continuous tone transparency is a negative of the artwork and has a gamma just under one-half.

With the above and other objects in view that will hereinafter appear, the nature of the invention will be more clearly understood by reference to the following detailed description, the appended claimed subject matter and the several views illustrated in the accompanying drawings.

Figures 3, 4, 5, 6, 6A, 7, 8:
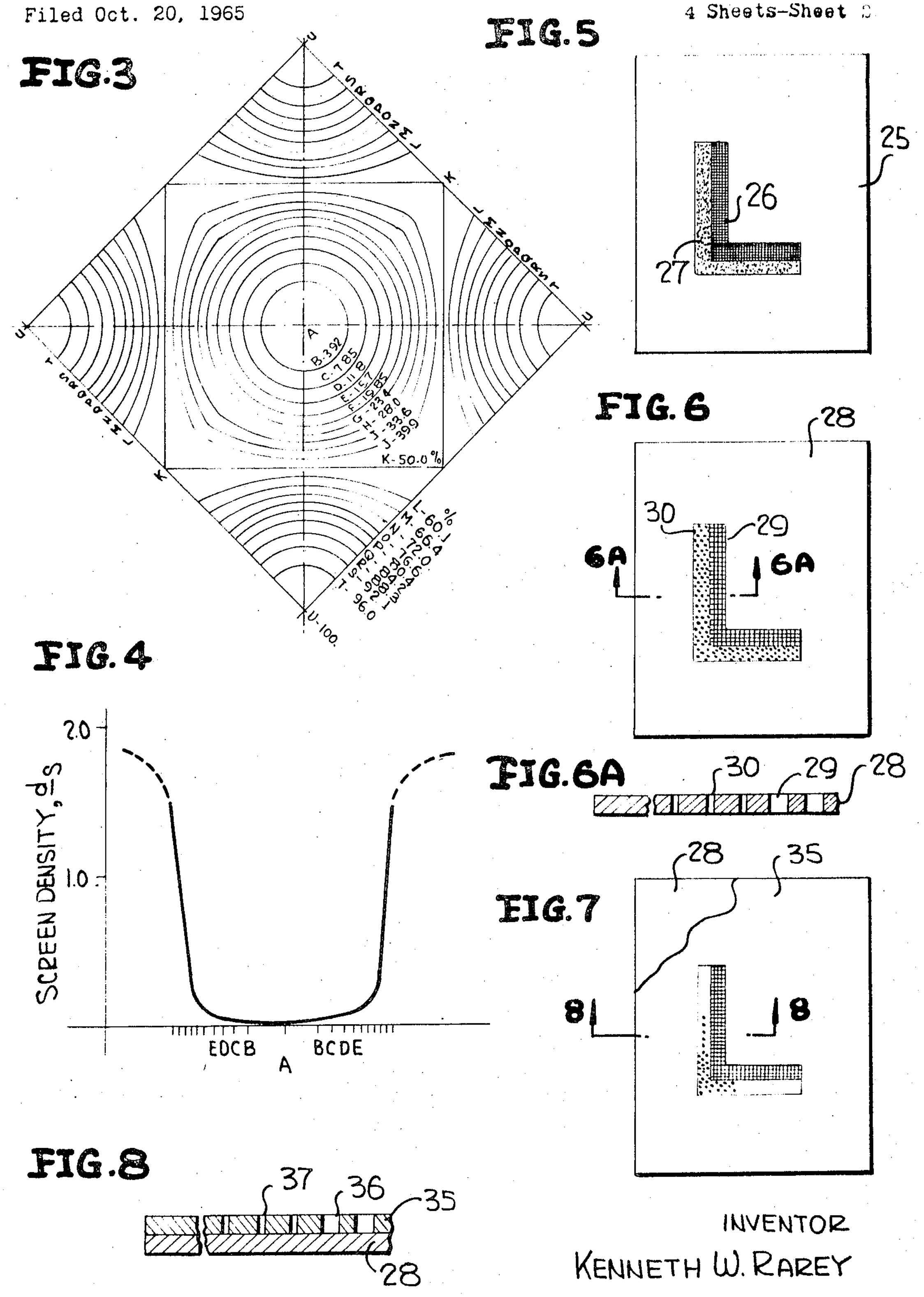
FIG. 3 illustrates representative conventional halftone dot shapes and areas.
FIG. 4 is a graph illustrating the theoretical variance of screen density with respect to location along a diagonal in a halftone unit cell.
FIG. 5 is a representative illustration of a final print and depicts the letter "L," and is intended to illustrate the tones perceived by a casual viewer in viewing a halftone print of the letter.
FIG. 6 illustrates a stencil, subsequent to etching thereof in a manner contemplated by the present invention, which will produce a halftone print of the letter "L" as depicted in FIG. 5.

FIG. 6–A is an enlarged cross-sectional view, taken along line 6A—6A of FIG. 6, and illustrates the difference in size of various apertures through the stencil.

FIG. 7 illustrates a photoresist coated stencil subsequent to exposure and processing of the photoresist material and prior to etching of the stencil.

FIG. 8 is an enlarged cross-sectional view, taken on line 8—8 of FIG. 7, and illustrates the washed-out areas of the photoresist material such that an etching process will produce the stencil illustrated in FIGS. 6 and 6–A.

FIG. 9 is a diagrammatic illustration of one manner of exposing the photoresist coating material utilizing a light source, a ground glass and a specially prepared halftone positive transparency which is prepared in accordance with the present invention.

FIG. 10 is an elevation view illustrating a continuous tone negative of the artwork to be reproduced, a specially prepared contact screen and a sheet of film to form the halftone positive transparency, arranged so as to make a contact exposure of the continuous tone negative and contact screen upon the subjacent sheet of film.

FIG. 11 is a plan view illustrating the continuous tone negative which, as is shown in FIG. 10, is superimposed upon the contact screen during exposure of the film to produce the halftone positive.

FIG. 12 is an enlarged plan view of a fragment of a contact screen constructed in accordance with the present invention.

FIG. 13 is a greatly enlarged illustration of one dot of the contact screen illustrated in FIG. 12.

FIG. 14 is an elevation view of a unit cell which is utilized in accordance with the present invention to produce the contact screen of FIGS. 12 and 13.

FIG. 15 illustrates one manner of arranging a light source emitting monochromatic radiation, a unit cell maintained in location by two sheets of transparent glass, a pinhole camera obscura so as to expose a sheet of film which, upon development, provides a contact screen in accordance with the present invention.

FIG. 15–A illustrates another manner of producing a contact screen in accordance with the present invention.

FIG. 16 illustrates one manner of arranging a light source, a unit cell maintained in location by two sheets of transparent glass and a sheet of film which, upon development, becomes a large negative continuous tone transparency of a unit cell which is used in the manner illustrated in FIG. 15–A for producing a contact screen.

Figure 17:
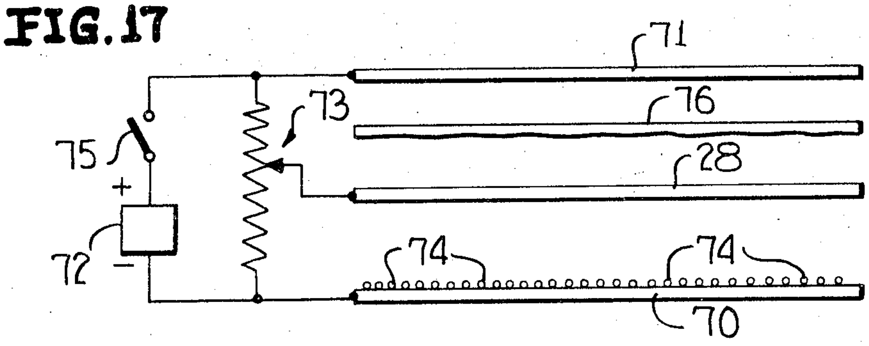

FIG. 17 is a diagrammatical side view of apparatus for electrostatic screen printing which utilizes a stencil prepared in accordance with the present invention so as to produce a halftone print of a desired image upon a substrate.

Figure 18:
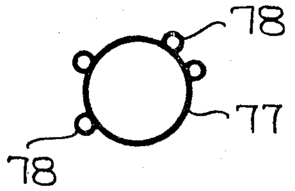

FIG. 18 is an enlarged diagrammatical illustration of a development particle comprising a plurality of small toner particles adhering to the peripheral surface of a relatively large carrier particle.

Figure 19:
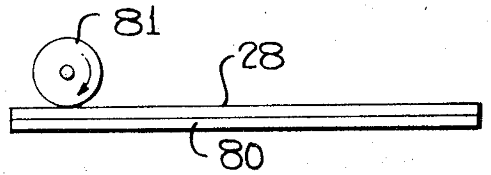

FIG. 19 is a diagrammatical view illustrating a manner of using a stencil, constructed in accordance with the present invention, in a conventional contact stencilling process.

Figure 20:
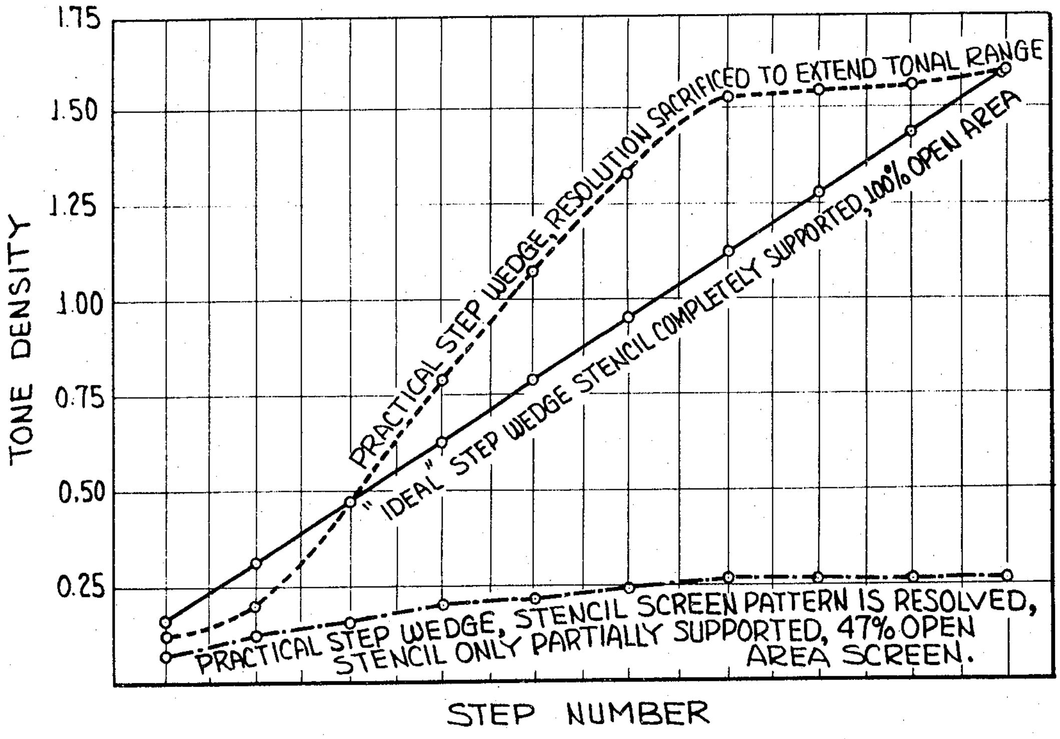

FIG. 20 is a graph depicting the comparison of various printed step wedges with an "ideally" printed copy of a step wedge.

A type of screen process printing known as electrostatic screen printing is currently under development. It appears that several different methods of practicing this process are required to accomplish the wide range of printing tasks to which it can be successfully applied. Although these different methods take quite different forms, certain considerations are common so that a description of a single method will provide some insight into the principles of all. One form of this method will be described so as to provide background so that the present invention may be more readily understood.

In the known method of electrostatic printing, a stencil-supporting, electrically conductive screen is located near and parallel to a coextensive sheet electrode. The screen and electrode may be planar or may be curved into some simple shape, such as a cylinder or a portion of a cone. An object to be printed is located between the screen and sheet electrode, which must be sufficiently separated and appropriately shaped to accommodate its inclusion. A high voltage, direct current power supply is connected between the screen and sheet electrode, which essentially constitute the plates of a parallel-plate capacitor.

The "ink" for this process is a finely-divided powder made of a pigmented or dyed material which is a good electrical insulator. This powder, known as toner, generally has a low melting temperature. It is applied to the side of the screen opposite that facing the object to be printed, generally with a roller similar to those used for painting, or is blown onto the screen by a current of air. As the toner is pushed through the unblocked screen apertures, it acquires electrical charge from the charged screen. The charged toner is electrically accelerated by the electric field between the screen and sheet electrode, and moves toward the sheet electrode until intercepted by the surface of the object being printed. After a sufficient amount of toner has been deposited in this manner, the flow of toner is interrupted and the object is removed from its location between the screen and sheet electrode. The charge on the toner tends to maintain the image on the surface. Then the object is heated or exposed to vapor of an appropriate solvent until the image is permanently adhered to the object.

If the object being printed is located sufficiently near the screen while toner is being deposited, the screen apertures are readily resolved. However, since the toner particles all carry charge of the same polarity, they tend to repel each other. After a beam of such particles passes through an unblocked aperture, this mutual repulsion produces a divergence of the beam. An object located sufficiently far from the screen will thus not exhibit a screen pattern. Since the wires of the screen occupy approximately 50% to 65% of the screen area, it is sometimes useful to locate objects such that the screen apertures are not resolved. Otherwise, the darket tones that may be printed with a black toner are rather light grays. However, this method can only be used if the pattern to be printed is everywhere large when compared to the screen aperture size. Otherwise, failure to resolve the screen apertures will result in a marked deterioration of the pattern definition.

A capability of toner reproduction is a desirable feature for a printing process. Tones are commonly printed by a practice known as the halftone method. Tiny spots, all of the same optical density, are printed on the desired surface. The dots are generally too small to be resolved by the unaided eye when observed from the proper viewing distance. There are typically between 3,000 and 20,000 such dots in each square inch of halftone printing in newspapers, magazines and small signs such as are frequently encountered. In a given print, the number of dots per unit of area is constant, and different tones are produced by a difference in dot size. When an area printed with such dots is observed, the viewer perceives a tone, the brightness of which is a function of many variables. These include its illumination, the characteristics of the surroundings, the optical properties of the substrate, the ink being used for printing the dots, etc. The primary variable used for producing tones of different brightness in a given print is the area of the dots relative to the area of the substrate over which they are distributed. For tones printed with a black toner that are to be high in brightness, i.e., light grays, the dots have a circular shape. They are dots whose total area may occupy up to about 30% of the area over which they are distributed. For tones of little brightness, i.e., the dark grays, an area is printed solidly with the exception of perforations in the image through which the substrate may be observed. These perforations are of comparable size and shape to the dots printed for producing the light tones. Thus, the dots associated with the light and dark tones are the inverse of each other with regard to that which is printed and that which is not printed. When 50% of the area is printed, the dots generally form a checkerboard pattern. The dots are now square in shape, and each is surrounded by squares of exposed substrate of identical size, and vice versa. The small circular dot of a light tone evolves in size and shape into the larger, square shape of the checkerboard dot as one progresses toward the middle tones. The evolution of the dot as one progresses further along the gray scale is such that the exposed substrate experiences an inverse evolution to that of the dot during the previously considered portion of the tonal range.

As previously observed, the number of dots per unit of area is the same throughout the range of tones. The specific number per unit area is selected on the basis of the pattern to be printed, the viewing distance, the surface to be printed, the method of printing, etc.

When an area printed in such a manner is observed, the tone that is perceived by the viewer is synthesized from the combination of printed and unprinted regions. Since these printed and unprinted regions are not generally resolved, such an area is perceived as if it had a single optical reflection coefficient throughout its extent. If a halftone printed area reflects illuminating radiation the same as an area which is uniform, they are perceived as having substantially the same tone.

The functional relationship between the percentage of a printed area associated with the dots, and the optical density of that area is not a linear one. This means, for example, that the middle tone of a complete gray scale is not associated with the checkerboard pattern that occurs when the dots occupy 50% of the total area. Instead, the functional relationship is logarithmic. The exact relationships for printing inks of several densities, *d*, and for both positive and negative halftone transparencies are presented graphically in FIG. 1. It may be seen that the eye is much more responsive to changes in dot area at the dark end of the gray scale than at the light end, for positive patterns.

Printing plates can be produced to print halftone patterns; this is the common method of reproducing tones. However, a halftone pattern of a complete gray scale, from white to black through the intermediate tones, could not heretofore be free-standing, i.e., self-supporting. Thus, printing methods such as letter press, lithography, gravure and screen printing are used to reproduce such patterns, but not simple stencilling.

If a halftone stencil of a complete gray scale is to be supported on a screen for screen printing, the screen should have a much finer mesh than the halftone. A conventional screen for screen printing will only have about 35% to 50% of its total area associated with the apertures. Thus, when a stencil is mounted on the screen, 50% to 65% of the stencil is obscured by the screen. Two types of difficulties arise if the screen mesh is not very fine relative to that of the halftone. First, the small circular halftone dots of the stencil for the darkest tones may not be supported by the screen, and may be completely lost. Second, the screen can obscure the halftone pattern sufficiently, particularly near the ends of the scale, to greatly alter the tones from those associated with the stencil alone. If either a dot near the dark end or a perforation in the stencil near the light end of the tonal range falls on one of the wires of which the screen is woven, this part of the pattern can be substantially obscured. The influence of the screen is less near the middle of the range, though even here it can be appreciable. Thus, it will be seen that the screen exerts a non-linear influence on the pattern over the tonal range.

If the screen mesh is much finer than the halftone pattern, these considerations need cause only minimal concern. If the halftone dots or perforations found near the ends of the gray scale are equal in area to a number of the screen apertures, the stencil can no doubt be adequately supported by the screen. In addition, the screen apertures need not be resolved in order to provide visually acceptable reproduction of the halftone pattern. Thus, although exact tones are not reproduced, each tone can be distinguished and visually acceptable printing can be accomplished. If the stencil-bearing screen is to be used with an electrostatic screen process, separating the object from the screen an appropriate distance during printing can obscure the screen pattern as previously described. And yet, with relatively large halftone dots, acceptable pattern resolution can occur.

A difficulty arises in situations where the screen mesh simply cannot be made small compared to the halftone pattern. Consider a printed image that is to be viewed from a normal reading distance. For example, consider the decoration on typical cans or bottles. If such a decoration contains a halftone pattern, the halftone should have about 100 to 130 dots per inch. A screen with about 400 to 500 apertures per inch would be required to permit visually acceptable reproduction of about 10 tones, somewhat equally distributed between the tone of the bare substrate and that of a solidly printed area. However, a screen finer than about 300 apertures per inch cannot be used very well as the aperture size is then approaching the toner size which is in the neigborhood of 17 microns. Another reason why 400 to 500 mesh screens are not desirable is that the relatively low percentage of open area in screen obscures too large a fraction of the stencil pattern. Thus, it appears that conventional methods are not very applicable to a printing task of this type. The source of the difficulty is the screen.

There is an additional consideration with regard to printing halftones by an electrostatic screen process, that is of fundamental interest. One of the most useful characteristics of electrostatic screen processes is the capability of printing without contact between the screen and the surface being printed. Thus, shaped objects and coarse-textured surfaces can be easily printed. However, as was previously observed, if the screen and surface are separated, a beam of toner particles will diverge before reaching the surface. This divergent beam will increase the area of printed halftone dots. At a given separation, the small dots will increase the least amount, and the square dots, with their larger perimeters, will increase the most. The point is, there will be a non-linear distortion in the density of the halftone pattern. In addition, due to the logarithmic relationship between dot area and tone, the changes that occur near the dark end of the gray scale will be more readily perceived than those near the light end. The result is that all tones are shifted to darker tones, and the shift is non-linear. It may be concluded that a single halftone pattern will not produce contact and non-contact printing of the same quality. Conventional halftones, normally prepared, are best suited for contact printing rather than non-contact printing.

The several considerations indicate that a halftone system should be devised which is essentially suited to the characteristics of an electrostatic screen process. In addition, because of the adverse effects of the screen on tonal patterns in general, and on halftones of fine mesh in particular, it appears that a free-standing stencil would be desirable. It is a primary purpose of this invention to show that a free-standing stencil can be designed which will permit printing a broad range of tones.

The first consideration is that of converting a continuous tone subject, such as a gray scale, into an appropriate halftone pattern. One way of accomplishing such a conversion is through the use of a device known as a contact screen.

A contact screen is an optical filter. It has an optical density which is a function of location over its full extent. A basic density pattern is associated with the formation of a single halftone dot, and this pattern is repeated at a spatial frequency that is identical with that of the halftone pattern it will produce. In use, the contact screen is located in intimate contact with a special type of high contrast photographic film. This film exhibits a highly critical response to exposure. For exposure less than a particular value, there is no blackening of the emulsion after development, i.e., the optical density of the silver image in the emulsion is low. For any exposure greater than that particular value, there is complete blackening. A continuous tone pattern is projected through the contact screen onto the film. The contact screen acts on the intensity of the light associated with the image, superposing its own intensity variations on those characteristic of the continuous tone pattern. The result is that the continuous tone image is broken up into a halftone latent photographic image. The size of each dot is a function of the intensity of the light from the corresponding point in the continuous tone pattern. A contact screen can be designed to produce a dot of a predetermined size and shape for any given density in a continuous tone pattern. It is a purpose of this invention to produce a design for a contact screen which is particularly applicable to electrostatic printing. An addtional purpose of this invention is to provide a method of preparing this contact screen. The design will be primarily a demonstration of considerations concerning a particular printing task. Different tasks, though, will result in different specific designs, but can be acquired through application of the same steps.

The specific problem to be considered here is this: the design of a contact screen that can be used to prepare a free-standing stencil, that is a stencil which does not need to be supported by the conventional mesh screen, that will permit printing a wide range of tones when used in an electrostatic stencilling process. In addition, the tones in the printed pattern are to bear a specific relationship to those in a specified continuous tone pattern.

The first step is to specify the continuous tone pattern that is to be reproduced. Let this be a gray step wedge with a maximum optical density of 1.60. The first step of the wedge, the lightest gray, is to have a density of 0.10. The printed pattern for this case is to match the tones found in the step wedge. This relationship is indicated graphically in the first quadrant of the graph in FIG. 2. It is not necessary that the printed image bear this particular relationship to the continuous tone original. This is simply the relationship selected for this example. However, it is a practical selection.

In addition, let it be further specified that an area uniformly printed with the specific toner to be used would have an optical density of 1.60. The maximum optical density obtainable with a given toner is that obtained in this manner. Thus, in order to accomplish the specified goal with this toner, an extended area must be uniformly printed anywhere that the maximum optical density is required. The goal could not be achieved at all if the uniformly printed area exhibited an optical density less than that desired in the final copy. However, if a uniformly printed area exhibited an optical density greater than any required in the printed pattern, only partial coverage would ever be required. Thus, reaching the selected goal is reasonably difficult; the task could have been made easier by selecting a toner of higher optical density, relative to that desired in the printing.

The next step is to decide upon the number of dots per unit of linear measure desired in the halftone pattern. As previously indicated, the stencil is to be free-standing. Thus, normal restrictions imposed by a supporting screen are avoided, and a halftone of finer mesh can, therefore, be selected. A wider range of patterns and viewing distances can be handled by such a pattern, but there is even more to be gained. In printing with a free-standing stencil, if such a stencil is to have the capability of printing any tone in its range at any location over its entire extent, it must exhibit a screen-like construction in even its most open areas. In order to have sufficient strength to be used in a printing operation, probably not more than about 45% to 60% of its total area can be associated with the apertures. For the particular printing task selected, 100% of an area in the print must be covered from those areas of the stencil exhibiting this 45% to 60% open area. This can be done by separating the stencil from the surface being printed a sufficient amount so that the toner beam coming through the stencil apertures will diverge a sufficient amount to cover 100% of that part of the print. The more apertures that go into making up this 45% to 60% area, the greater the perimeter will be for that area. Since it is along the edges of the apertures that the spreading of the beam occurs, the more perimeter the better.

Figure 1:
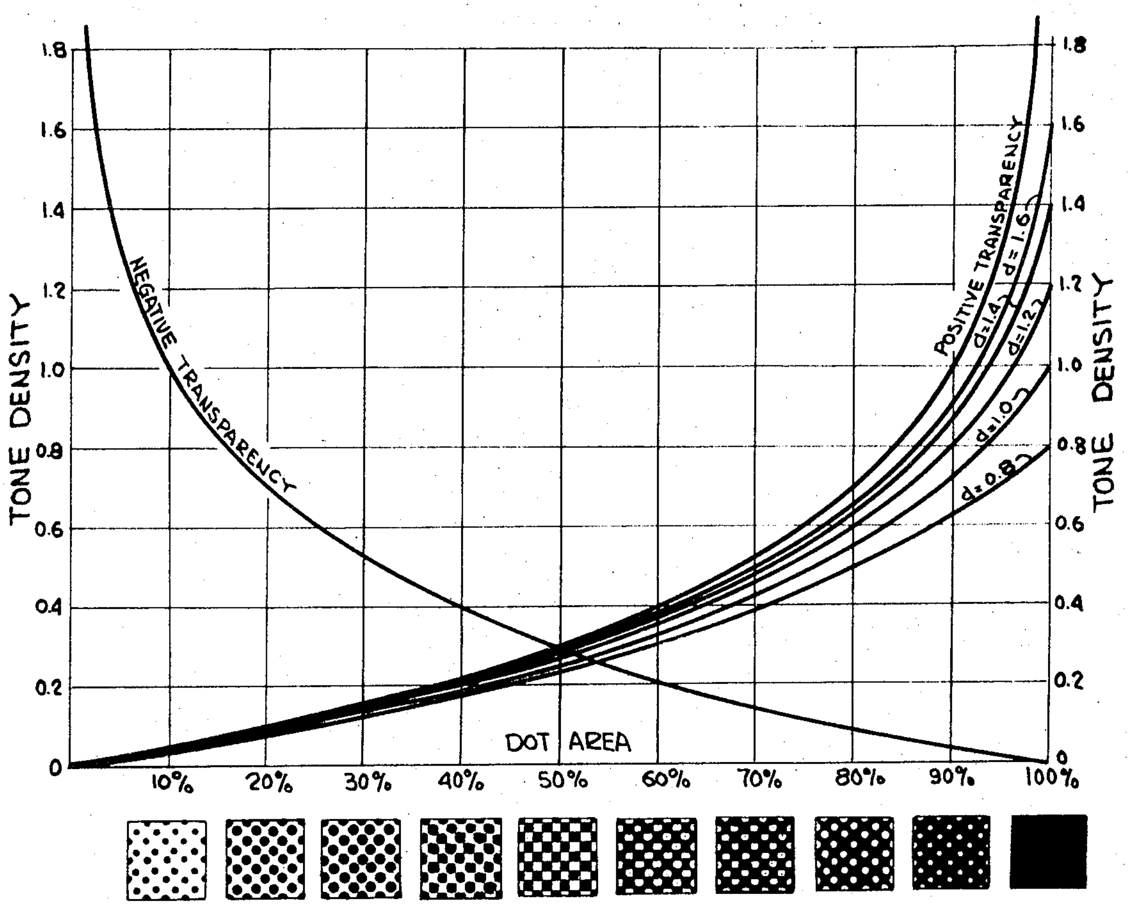
FIG. 1 is a graph illustrating the logarithmic nature of tone density as a function of dot area for transparencies and for inks of particular densities, *d*.
Figure 2:
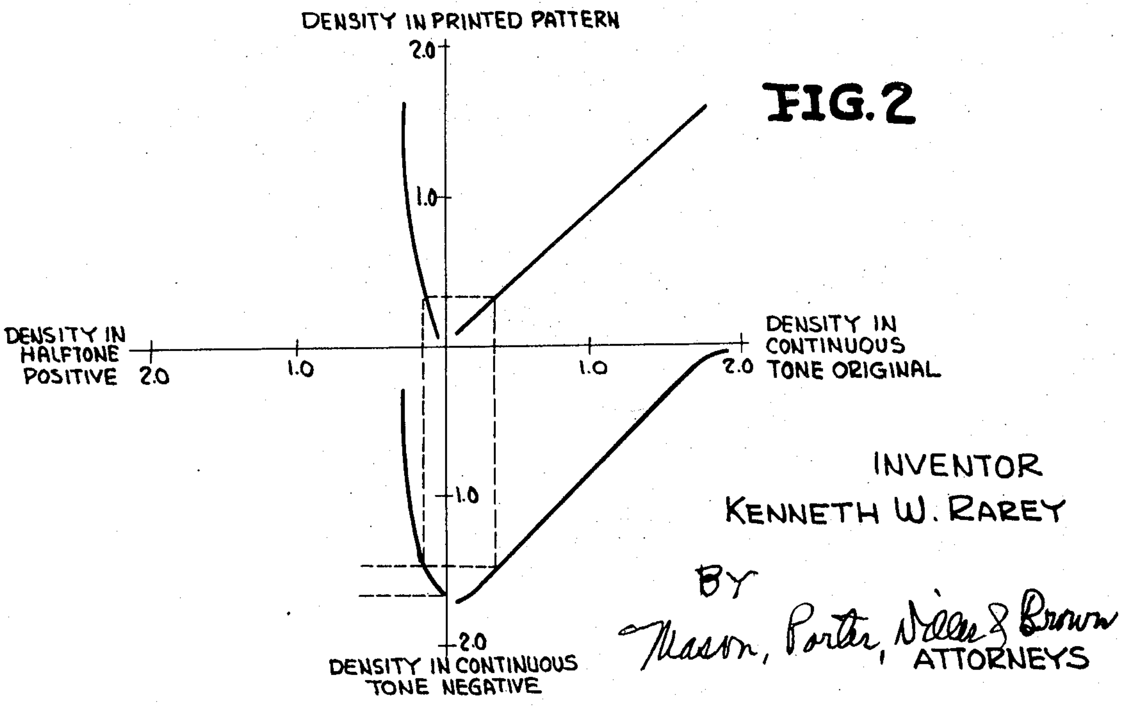
FIG. 2 is a 4-quadrant graph of design data for making a contact screen for electrostatic screen printing.

Another consideration places an upper limit on the number of dots per unit of linear measure. There is a minimal size limitation imposed on stencil apertures by the toner particle size: holes too small will not pass toner. The smallest practical size that a stencil aperture can have, for a given toner, can be experimentally destermined. The number of apertures per unit area when multiplied by the area of a single aperture gives the fraction of a unit area associated with the apertures. A relationship exists between this fractional area and that which would be printed by this stencil under a given set of conditions. The fractional area in the print will, of course, exceed that in the stencil. Now with a specified density for the lightest gray tone of 0.10, and with the aid of the graph in FIG. 1, it can be determined that the percentage area to be printed in the final print to produce the lightest gray is about 20%. The graph in the second quadrant of FIG. 2 shows an estimated relationship between density in a halftone positive used to make a stencil through a contact exposure, and density in the resulting printed pattern. From this graph, it may be observed that an integrated optical density of about 0.03 in the halftone positive is associated with a density of 0.1 in the final print. Referring again to FIG. 1, a dot area of about 5%, or 0.05, in the halftone will produce this lightest gray in the final print. The aperture area in the stencil must equal this 0.05. Experiments shows that an aperture diameter of about 2.0 mils is the smallest that should be used with customary toners. The area of such an aperture is $3.14 \times 10^{-6}$ inches squared. For 5% of the area to be associated with the dots, about 16,000 dots per square inch would be needed, or a halftone pattern of about 126 dots per inch. If the halftone dots become squares at the maximum dot size, they will thus be about 5.4 mils on a side, separated by a distance of about 2.6 mils. This appears to be quite a good halftone mesh. It should permit accomplishing the selected task, and for patterns exhibiting fine detail intended for close viewing.

At this point, it is necessary to select a method of getting from the original artwork to the stencil. There are different ways one might go, and the contact screen design would vary, depending on the particular path selected. There are fundamental considerations that are applicable to any sequence of operations actually used, and these are, of course, of most interest. So, in order to be able to explain in detail the ideas of basic interest, a specific approach will be considered.

First, a continuous tone negative is to be made from the continuous tone original artwork. The desired relationship between tones in the original and tones in the negatives is shown in the fourth quadrant of the graph in FIG. 2. Now, the stencil is to be made in the following manner. (1) Select a stencil material, such as 0.005" thick stainless steel; (2) coat this stencil material with an appropriate photoresist such as Kodak Thin Film Resist; (3) make a halftone positive transparency by making a contact exposure, in a vacuum printing frame, on Kodalith Ortho 3 film, using the continuous tone negative of the artwork, a specially prepared contact screen and the film, arranged in that order; (4) use the halftone positive transparency thus prepared and make a contact exposure on the photoresist-coated stainless steel stencil material; and (5) process and etch the stencil.

Now that a particular sequence of operations has been selected, the design of the contact screen may proceed. The first consideration is that of dot shape. A reasonable first selection is to use shapes such as those obtained with a crossline screen, over the range from the smallest dot up to about the point of 45% to 60% coverage. This is about as far as one can expect to go with a free-standing stencil. Conventional dot outlines, along with an indication of the area associated with each, is given in FIG. 3. It is desirable to select the same shapes through J plus one more of a size exactly intermediate between J and K. The optical density desired in the contact screen at each boundary B through J will be described, plus the density for the additional dot which will be designated $J^1$. A graph of optical density versus location is to be plotted for these boundaries, and a smooth curve will be drawn connecting these points, indicating the preferred optical density at intermediate points.

The method of screen design is a graphical method developed by Paul W. Dorst and described in Research Bulletin No. 16 of the Lithographic Technical Foundation, Inc., entitled "A Method of Designing and Making Contact Screens."

The design information is actually taken directly from the graph in the third quadrant of FIG. 2. A description of the method will be described for a single dot size. In practice, this is repeated for each dot from B through $J^1$.

Consider dot H in FIG. 3. This dot occupies 28% of the area of a single halftone cell. Referring to FIG. 1, it may be seen that 28% coverage would have a tone density of about 0.15 in a positive halftone transparency. So, in FIG. 2, the point 0.15 is located on the axes marked "density in halftone positive." From this point, a line is drawn vertically and upward until it meets the curve in the second quadrant. From this point a line is drawn horizontally and to the right until it meets the curve in the first quadrant. From this point a line is drawn vertically and downward until it meets the curve in the fourth quadrant. From this point a line is drawn horizontally and to the left. Now, from the original point, where this construction started, a line is drawn vertically and downward until it intercepts the line which entered the third quadrant from the fourth quadrant. This locates a single point on the curve drawn in the third quadrant. If this is repeated for each dot, B through $J^1$, the entire curve in the third quadrant can be drawn. This is simply a graphical method of obtaining the curve in the third quadrant from the information plotted in the other three. This method, of course, is not essential. The graphs in quadrants 1, 2 and 4 relate certain variables of this reproduction process. From these relationships it is possible to directly relate two of these variables, for which an explicit relationship was lacking. This could have been done analytically, but this particular graphical approach is easier.

It is from the graph in the third quadrant that the information is acquired for making the contact screen. So, the basic piece of information needed to design a contact screen that will permit one to make a halftone positive transparency from a continuous tone negative transparency is this: What is the required functional relationship between density in the halftone and those in the continuous tone negatives?

In summary, the graph in the first quadrant relates the tones desired in the final print to those in the original artwork. This is completely a matter of choice. In the selected example, the tones selected are equal. The graph in the second quadrant is obtained experimentally and indicates the functional relationship between a halftone transparency used to make a printing stencil and the printing accomplished from that stencil. This will be strictly a function of the printing process. Variable such as the separation of the screen from the object being printed and the electric field intensity in this region will determine the exact shape of this curve. The graph in the fourth quadrant relates tones in the continuous tone negative to those in the original artwork. A linear relationship has been selected for this specific illustrative example, which means that it is desired to operate on the straight-line portion of the Hurter and Driffield curve for the film. When the optical density of the continuous tone negative must have a linear relationship with the optical density of the original artwork and also must have the same absolute range of optical density, the straight-line portion of the Hurter and Driffield curved curve is characterized as having a gamma of 1. From these three relationships, it has been possible to find an explicit relationship between two of the variables which was not previously available in such a form. It is from this relationship that the contact screen characteristics can be derived.

In addition to the curve in the third quadrant of FIG. 2, a fundamental principle concerning contact screens in general must be used, viz., "at the borders of all dots in all tone areas of any one image, the sum of the density of the continuous-tone image and the density of the contact screen is constant." This principle is set forth in the above referred-to Research Bulletin No. 16.

Applying this principle to the graph in the third quadrant of FIG. 2 is quite simple. Merely select the point on the curve where the density of the continuous tone negative is a maximum, and from this point draw a horizontal line. The distance from each point on this line to the points directly above it on the curves, designated $d^s$ represents the density required for the associated point on the contact screen. The general principle states that the sum of densities of the contact screen and continuous tone negative must be a constant in order that a dot be formed. The value of the constant is a function of the exposure made through the contact screen and continuous tone negative onto the film that will become the halftone transparency. This expsoure can be controlled to make this constant the value associated with the continuous tone negative when it is a maximum. Then the density value for any particular point can be found by subtracting the value of the density found from the curve in the third quadrant from that maximum value.

For example, it is desired to determine the value of the density of the contact screen along the boundary of the dot designated H in FIG. 3. Returning to FIG. 2, the value of $d^s$ is seen to be 0.2. Now this procedure is to be repeated for every dot, B through $J^1$. In summary, the exact procedure to be followed is this: (1) by referring to FIG. 3, the area associated with each dot, B through $J^1$ can be determined, and listed in a table as in column II in the hereafter-listed Table A; (2) by referring to FIG. 1, the tone density for a screen positive can be determined for each dot boundary, and these are listed in column III of Table A; (3) by referring to the graph in the third quadrant of FIG. 2, the value of the density of the continuous tone negative associated with each dot boundary is determined, and these are listed in column IV of Tablet A; and (4) each value of the density of the continuous tone negative found in column IV is now subtracted from the maximum value the density can have, in this case 1.7, and these values are then listed in column V.

TABLE A

| I | II | III | IV | V |
|---|---|---|---|---|
| Dot designation | Dot area, percent | Tone density for screen positive | Density of continuous tone negative | Screen density at dot boundary, $d^s$ |
| Point: | | | | |
| A | 0.00 | 0.00 | 1.7 | 0 |
| B | 3.92 | 0.02 | 1.68 | 0.02 |
| C | 7.85 | 0.035 | 1.66 | 0.04 |
| D | 11.8 | 0.055 | 1.64 | 0.06 |
| E | 15.7 | 0.075 | 1.62 | 0.08 |
| F | 19.65 | 0.10 | 1.6 | 0.1 |
| G | 23.4 | 0.12 | 1.58 | 0.12 |
| H | 28.0 | 0.14 | 1.5 | 0.2 |
| I | 33.6 | 0.18 | 1.1 | 0.6 |
| J | 39.9 | 0.22 | 0.7 | 1.0 |
| $J^1$ | 44.95 | 0.26 | 0.2 | 1.5 |

Now a graph may be plotted which relates these values in column V against location along one of the axes shown in FIG. 3. The resulting graph is shown in FIG. 4. This is the result being sought. This specifies the functional relationship required between screen density and location in a unit cell of the contact screen. This pattern must, of course, be repeated at the proper spatial frequency to give a halftone with the desired number of dots per inch.

A screen having this particular design may now be used, as previously described, to make a halftone positive. From this a stencil can be made. Printing can be done with this stencil, under the identical conditions described by the graph in the second quadrant of FIG. 2, to produce the desired final results. A contact screen is only of use for the exact printing conditions for which it was designed. Any appreciable variation in operating conditions would require a new screen design.

The screen design described here is of particular value for printing on surfaces that are essentially a uniform distance from a printing stencil. However, this is not a necessary condition. A contact screen could be designed for particular surfaces to be printed that would involve considerations relative to a varying separation. In fact, a surface of this type could best be printed with an approach of this type, rather than if these considerations were ignored.

In order that the invention may be clearly understood, a complete sequence of practicing the invention will be hereinafter described. A representation of a desired final print is illustrated in FIG. 5. A substrate 25, which may be made of either conductive or non-conductive material having either smooth or rough surfaces, is illustrated as having the letter L printed thereon. FIG. 5 is intended to illustrate what the casual viewer would perceive upon viewing a halftone printing of the letter L wherein the inner marginal edge 26 is composed of a plurality of halftone dots capable of producing a dark tone, while the marginal portion 27 is composed of a plurality of halftone dots capable of producing a light tone.

A stencil 28 capable of producing a halftone print of the letter L is shown in FIG. 6. The stencil 28 is made of a readily etchable material such as 0.005 inch thick stainless steel. In order to produce the image which is illustrated in FIG. 5, the stencil 28 must be provided with a series of large apertures 29, along the inner margin of the image, and a series of small apertures 30, along the outer margin of the image. It is a particularly important feature of this invention that the apertures 29 and 30 can be produced in the stencil 28 in one operation even though the apertures 29 and 30 vary both in size and in shape.

The stencil 28 is shown in FIG. 7 as being coated with an appropriate resist 35 which is capable of protecting the stencil material so as to prevent etching thereof in undesirable areas. The stencil material 28 and resist material 35 are illustrated in FIGS. 7 and 8 just prior to etching of the stencil material to produce the apertures 29 and 30. As is best shown in FIG. 8, the resist material 35 has large openings 36 and small openings 37 which correspond to the large apertures 29 and small apertures 30, respectively.

FIG. 9 is a diagrammatic illustration of an arrangement of elements for exposing the resist material 35. A halftone positive transparency 40 is superimposed upon the resist material 35 and is separated from a light source 41 by a ground glass 42. The halftone positive transparency 40 includes a series of developed dots or spots 43 and 44 which correspond in size and shape to the openings 36 and 37 which are shown in FIG. 8. After the photosensitive resist material 35 has been exposed by the light 41, the resist material 35 is developed by washing in a known manner.

FIG. 10 illustrates a manner of making a contact print so as to produce the halftone positive transparency 40. A sheet of undeveloped film 40' is exposed by passing light through a contact screen or filter 45 and a continuous tone negative 46 of the artwork to be reproduced, which in this instance is the letter L. The continuous tone negative 46 is illustrated in FIG. 11 and is made in a conventional manner by taking a picture of the original artwork and then developing the negative. The contact screen 45 is produced in accordance with the present invention and will be hereinafter described.

FIG. 12 illustrates a greatly enlarged fragmentary portion of the contact screen 45 and shows a plurality of symmetrically disposed halftone dots 50. FIG. 13 is a vastly enlarged illustration of one such halftone dot 50. It will be seen that the dot 50 is comprised of a series of developed areas including a central portion, designated as A, in the form of a substantially circular halftone dot which is surrounded by a series of annular portions of increasing peripheries indicated by the letters B–J. The dot A and the surrounding annular portions each have a respective continuous tone optical density, and the optical density of the dot and the respective optical density of the annular portions vary so as to provide the spot or dot 50 with a stepped gradation of shading extending outwardly from the central portion A. Depending upon the particular type of resist material 35, the optical densities of the central portion A and annular portions B–J can be designed to either increase or decrease from the central portion of the dot 50 to the outermost annular portion thereof.

It should be noted that the central portion and the annular portions which make up the dot or spot 50 correspond in shape and relative areas to each other in accordance with the conventional halftone dot shapes and areas which are illustrated in FIG. 3.

The manner of actually making a contact screen after a design is attained will now be considered. A large negative continuous tone transparency is made of a unit cell which has the characteristics desired in the contact screen e.g., one such as is described in FIG. 5. The negative is to be hand-made by first uniformly exposing and developing sheets of film to obtain uniform sheets of desired optical densities. The densities should be those found by subtracting values in column IV of Table A from the number above it, as in the hereinafter set forth Table B. These sheets should be perhaps eight inches by ten inches. The dot shapes B through $J^1$, should then be enlarged such that the dot shape $J^1$ is about eight inches by eight inches, and the other dots maintain their proper size relative thereto according to FIG. 3. Then each dot, in the enlarged size should be cut out of the film with the proper density, as is indicated in Table B. These sheets of film are then superposed in the manner illustrated in FIG. 14 so as to provide a unit cell, generally indicated by the numeral 55. The unit cell 55 is maintained in location by squeezing between sheets of glass 56 and 57, as is shown in FIG. 15 or 16.

As is shown in FIG. 15, a sheet of wide-latitude film 45', which is to become the contact screen 45, is exposed to a light source 60 through an array of pinholes in a multiple-pinhole camera obscura 61, one pinhole at each location for a unit cell in the contact screen. If the light source 60 provides essentially monochromatic radiation, the images of the unit cell 55 on the film can be made quite sharp. Although monochromatic radiation may be preferred for the highest resolution, it it believed that useful results can be obtained with radiation composed of a range of wavelengths.

An alternative method of producing the contact screen 45 is illustrated in FIGS. 15–A and 16. A large negative continuous tone transparent 65 of a unit cell 55 is located between a light source 66 and a multiple-pinhole camera obscura 61 such that, using the transparency 65 as an object, a sheet of wide-latitude film 45″ is exposed with an array of images of a unit cell and, upon development, the film 45″ becomes a contact screen 45 such as is used in the manner illustrated in FIG. 10. The large negative continuous tone transparency 65 is conveniently produced in the manner illustrated in FIG. 16 by exposing the sheet of film 65 to light from a light source 67 which passes through the unit cell 55.

The following Table B is a tabulation of design data for producing a negative transparency of a contact screen unit cell.

TABLE B

| I | II | III |
|---|---|---|
| Dot designation | Density of continuous tone negative ᵃ | Density of dot to make negative transparency |
| Point: | | |
| A | 1.7 | |
| B | 1.68 | 0.02 |
| C | 1.66 | 0.02 |
| D | 1.64 | 0.02 |
| E | 1.62 | 0.02 |
| F | 1.6 | 0.02 |
| G | 1.58 | 0.02 |
| H | 1.5 | 0.08 |
| I | 1.1 | 0.4 |
| J | 0.7 | 0.5 |
| J¹ | 0.2 | 0.2 |
| Beyond point J¹ | 0.0 | |

ᵃ From column IV of Table A.

The stencil 28 which is produced by the present invention is ideally suited for use in an electrostatic screen printing process in the manner illustrated in FIG. 17. A base electrode 70 is shown as being disposed in parallel relation to a back electrode 71 and interconnected by a high voltage power source 72 so as to produce a high intensity electric field therebetween. The stencil 28 is mounted upon suitable supports (not shown) so as to be disposed between the base electrode 70 and the back electrode 71. If desired, the stencil 28 may be connected to a voltage divider 73. Conductive toner particles 74 are disposed upon the base electrode 70 and, upon closing of a switch 75, the toner particles are transported in a known manner through apertures in the stencil 28 toward the back electrode 71. By interposing a substrate 76 between the stencil 28 and the back electrode 71, the toner 74 is caused to impinge thereon so as to provide a printed image in accordance with the pattern formed in the stencil 28. If so desired, non-conductive toner particles 78 can be substituted for conductive toner particles 74 and may be triboelectrically attached to carrier particles 77, as is shown in FIG. 18, which carrier particles may be formed of a conductive material such as charcoal, metal shot made of various materials, such as steel, aluminum, copper, or, preferably, small granular iron filings or nickel shot of a range from abound 25 to 1,000 microns. It will be apparent that the lower limit of carrier particle size is determined by apertures in the stencil 28. The apertures in the stencil 28, such as the apertures 29 and 30, as is shown in FIGS. 6 and 6–A, must be large enough to permit passage therethrough of the toner 74 and be small enough to block passage therethrough of the carriers particles 77. It is apparent that the carrier particles 77 are much larger than the toner 74 and a number of toner particles can adhere to a single carrier particle 77 because of triboelectric forces.

As is shown in FIG. 19, the stencil 28 is not limited to use in an electrostatic screen printing process but may also be utilized in a conventional stencilling process by making a contact print upon a substrate 80 by forcing ink from an ink roller 81 through apertures in the stencil 28.

It will be apparent from the foregoing that tones can be produced in electrostatic screen printing processes by using a self-supporting stencil with a halftone pattern. In previously known methods, it was necessary to support the stencil upon a fine mesh wire screen. It is common that such a supporting screen has a total open area that generally lies between about 35 and 50 percent of the total screen area. The remaining area is associated with the wires or threads from which the screen is woven. Thus, between 50 and 65 percent of the stencil is actually obscured by the screen. If the supporting screen is much finer than the halftone pattern, this is not particularly troublesome. Ink can be permitted to flow sufficiently on a printed pattern to fill the areas blocked by the wires during printing. This can be done without appreciably disturbing the tones or resolution of the pattern.

For many printing tasks, this method is completely adequate. Posters, for example, can be printed using a halftone of 55 or 65 dots per inch. The stencil can be mounted on screens of 200 to 250 mesh and up to 47% open area. The difficulty arises when halftones of finer mesh are desired. The condition that the screen be much finer than the halftone is then extremely difficult to realize. If, additionally, it is desired to use a supporting screen with a relatively large percentage of open area, thhe problem can be virtually impossible.

A mathematical relationship exists between halftone mesh, screen mesh, ink optical density, the number of tones into which the range is divided, and the number of tones to be printed within that range. This mathematical relationship indicates that this basic stencil-screen approach is limited to coarse halftones, 55 or 65 lines per inch, if more than 5 or 6 linearly distributed tones are desired in the range provided by the ink and surface being printed.

This limitation is due in part to the fact that the eye is most responsive to changes in optical density near the dark end of that tonal range. This is the region where most of the area is covered with ink. Relatively small areas, less than 8 to 10 percent, are left unprinted. However, from ⅓ to ½ of the available tones will lie in this range, depending on the optical density of the inks being used. It is understood that the stencil is a negative of the printed image. For any tone where more than 90% of the area is to be covered with ink, a relatively large area will be open in the stencil. The blocking portion of the stencil will consist of a dot with an area less than 10% of that available in one unit cell of the halftone. Several dot sizes are required in this range, some with, desirably, perhaps one or two percent area available to a halftone dot.

For fine halftones there are small dots and fine screens are required to support them. For example, a 100 line dot with a 4% area has a diameter of 0.00225 inch. This requires a screen of about 445 mesh for support. If this dot forms the tone that is the next to the darkest in the range, equal density differences between tones will permit only about four tones with an ink density of 1.6. The lightest tone would have a density of 0.4. A great many more tones are available in some portions of the range by sacrificing linearity. Also, the range may be extended to lighter tones. However, tones between 1.2 and 1.6 will not be controllable because the stencil will not be reliably supported by the screen. In addition, the screen of 445 mesh is not practical; the finest mesh most manufacturers supply is about 230. The smallest dot that such a screen will reliably support covers about 16% of the area available for a 100 line halftone dot. This means that there can be no readily controllable tones between densities of about 0.75 and 1.6. The blocking portions of the stencil are simply too small to be reasonably well supported by the screen. Tones formed in this range are formed only when the ink flows enough to reduce the size of the unprinted areas otherwise associated with lighter tones.

In addition, it is desirable to use a screen with a relatively large percentage of open area. Most manufacturers prefer to work with wires no smaller than 0.0014 inch in diameter. A 230 mesh screen woven of 0.0014 wire will have about 47% of its area open. Weaving more apertures per inch with this same wire will reduce the open area. Thus, the capability of supporting finer dots carries with it the disadvantage of obscuring an increasing amount of the stencil.

FIG. 20 is a graph which has three curves which provide a comparison between a halftone copy of a step wedge and a printed image intended to reproduce it. Curve 1 is an ideally printed copy of a step wedge. This "ideal" provides ten steps that are linearly distributed over the tonal range provided by the ink and substrate. This curve was calculated with the assumption that the screen supporting the stencil was sufficiently fine to support even the smallest halftone dot. In addition, the screen was considered to have a 100% open area, so that the stencil alone would determine which areas were to be printed and which were not.

Curve 2 indicates the effect of mounting the halftone stencil on a practical supporting screen. The halftone is of 65 mesh and the screen is 200 mesh. The print is to be made by just allowing ink on those areas where the stencil is open. No ink flow that would permit printing of areas blocked by the stencil or supporting screen is to be permitted. All tones are of relatively low density. Even the darkest tone would have less than 50% of the available area associated with the printed area because the supporting screen is less than 50% open. An ink of density 1.6 produces a tone with a maximum density of about 0.25. The four darkest tones are all the same since the dots in the stencil are too small to be supported by the screen.

Curve 3 is indicative of the kind of results obtainable by pushing an additional amount of ink through the stencil. The ink flows around the edges of each of the printed areas and makes them larger than the corresponding open portions of the stencil. Ink flowing through these portions of the stencil associated with the darkest tones can be permited to give 100% coverage. This will correspond to perhaps 46% open area in the stencil. This is the way halftone stencils are conventionally used to reproduce tones. A wide range of tones can be printed in this manner, but the number of tones in the range is somewhat limited. In addition, the slope of curve 3 is not the desired one, as presented in curve 1.

A stencil can be designed to partially correct this deficiency. By inspection of graphs such as FIG. 20, it can be seen that the small dots at each end of the normal halftone range should be eliminated for stenciling.

The pattern associated with the middle tones, steps 3 through 7 of the step wedge in curve 3, should then be extended over the entire tonal range. By this process, curve 3 can be made to closely approximate curve 1. This is a reasonable way to improve tonal reproduction in stencilling processes. However, this is still limited to coarse halftones because the basic problem still remains. The problem is to print tones with a halftone mesh in the range of 100 to 200 lines per inch. A wide tonal range must be available, and 10 or more linearly distributed tones within the range is desirable.

There is one final deficiency associated with a halftone stencil mounted on a supporting screen. This is the problem of moire patterns. The repetitive screen and halftone paterns geometrically combine to form a resultant repetitive pattern. This is a basic characteristic of overlapping patterns of this type and cannot be eliminated. However, orienting the patterns at a proper angle relative to each other can minimize the effect. When multicolor tone printing is done, moire paterns are obtained in each screen supported stencil, and also between different stencils, when they overprint. This results in an array of patterns which detract considerably from the desired quality.

In the present invention, the halftone pattern that is used is not the customary one. Instead, the stencil consists only of isolated openings in an otherwise continuous sheet. The stencil is free-standing, i.e., no separate supporting screen is used. Since no supporting screen is used, the halftone mesh can be much finer than was heretofore practical. Halftones of about 200 mesh are now practical and, in addition, the moire patterns resulting from screen and halftone interactions are eliminated.

From the foregoing, it will be apparent that a description of a design of a contact screen for making an improved stencil has been presented. One particular application of the design principles has been discussed in detail for illustration; the general procedure may be summarized as follows:

(1) A step wedge with a particular range of optical density was selected as the artwork to be reproduced. The range selected was 0.1 to 1.60.

(2) A relationship was selected between the densities of tones in the artwork and those in the printed reproduction. The chosen relationship was that these be the same.

(3) An optical density was selected for the toner to be used. This was chosen to be 1.60.

(4) A relationship between tones in a printed image and those in the positive halftone transparency used to make the stencil was assumed. This assumption was based on laboratory experience. The relationship is essentially linear with a high slope over the range of tones of interest.

(5) A method of producing the positive halftone transparency was then selected. This consisted of making a continuous tone negative, with gamma equal to one, of the original artwork and then using this with a contact screen of a unique design to make the positive halftone transparency.

(6) A contact screen was then designed for use with the continuous tone negative in the manner set out under 5, above.

An alternative method of producing a positive halftone transparency which differs from that listed under Item 5 above has some very desirable characteristics. A conventional contact screen may be used to obtain the positive halftone transparency from the continuous tone negative of the original artwork. This may be accomplished by selecting a small gamma for the negative transparency, instead of a gamma equal to one as was selected in the method first disclosed. A calculation of the particular gamma to be used can be made in a manner similar to that used to design the contact screen in the first disclosed method.

In FIG. 2, the relationships displayed in the first, second and fourth quadrants of this graph were either selected or determined by experience. From these relationships, using the method first disclosed above, the relationship in the third quadrant was deduced. In the alternative method now being discussed, a conventional contact screen is used; therefore, the relationship in the third quadrant is known and the curves in the fourth quadrant may be deduced. It should be recognized that using a conventional contact screen in this manner does not imply any appreciable variation from the halftone pattern that was to be acquired with the newly designed screen. Instead, a person using this method only utilizes a portion of the halftone range available with the conventional screen.

This approach permits the use of the readily available contact screen and avoids the lengthy development of a new one.

The relationship that will be deduced for the fourth quadrant of the graph in FIG. 2 will be one that is easily realized. It simply means that the continuous tone negative of the original artwork will have a gamma smaller than one, probably always just under ½. This is easily obtainable in a darkroom.

The originally discussed method is preferred; however, the alternative method has the advantage of being easier to practice initially.

A further consideration is the characteristics of the etching process used to make the stencil from the positive halftone transparency. In the foregoing disclosure, in effect, it was assumed that the etched stencil would be an exact negative of the positive halftone transparency. Experience has shown that there is not a one to one correspondence between dimensions in the transparency and those in the stencil. This is because of the extremely fine patterns that must be etched. Instead, the relationship between these dimensions is a function of the dimensions. This relationship can be determined experimentally by preparing a transparency with a series of small dots which cover the entire range of diameters desired in the final stencil. Using this transparency, a stencil can then be etched. Diameters of corresponding dots and holes can then be graphically recorded to reveal the desired relationship. This information must then be incorporated in the deductions to be made in making the stencil. These are to be used exactly as the other assumed relationships in either designing a contact screen or selecting a value of gamma for the negative. The final result is that a five-quadrant display would be used instead of one of four quadrants. The fifth quadrant, of course, would be displayed on another graph.

The optical density of an electrostatically printed area may also be greatly influenced by the fusing operation. For reliable results, this must be rigorously controlled. Only after the fusing operation is selected and repeatable should the experimental curve in quadrant 2 of FIG. 2 be determined.

While preferred forms and arrangement of parts have been shown in illustrating the invention, and preferred methods have been disclosed for practicing the invention, it is to be clearly understood that various changes in details and arrangements of parts may be made without departing from the spirit and scope of the invention, as defined in the appended claimed subject matter.

I claim:

1. A method of making a stencil for halftone printing, said method comprising the steps of selecting an etchable material for said stencil, coating said material with an appropriate photoresist; making a continuous tone transparency of the artwork which is to be reproduced, making a halftone transparency using the continuous tone transparency of the artwork and a halftone contact screen; making an exposure on the photoresist coated material through said halftone transparency, and processing and etching the exposed photoresist coated material.

2. A method of making a stencil for halftone printing, said method comprising the steps of selecting an etchable material for said stencil, coating said material with an appropriate photoresist; making a continuous tone transparency of the artwork which is to be reproduced, making a single exposure on the photoresist coated material by simultaneously using said continuous tone transparency of the artwork and a halftone contact screen, and processing and etching the exposed photoresist coated material.

3. A method of making a stencil for halftone printing, said method comprising the steps of selecting an etchable material for said stencil, and coating said material with an appropriate photoresist; making a continuous tone transparency of the artwork which is to be reproduced; making a contact screen comprising a transparent sheet having a pattern of symmetrically located spots thereon wherein each of the spots is comprised of a central portion in the form of a dot and a series of annular portions of increasing peripheries surrounding said dot; making a halftone transparency using the continuous tone transparency of the artwork and the contact screen; making an exposure on the photoresist coated material through said halftone transparency, and processing and etching the exposed photoresist coated material.

4. A method of making a stencil for halftone printing, said method comprising the steps of selecting an etchable material for said stencil, coating said material with an appropriate photoresist; making a continuous tone transparency of the artwork which is to be reproduced; making a contact screen comprising a transparent sheet having a pattern of symmetrically located spots thereon wherein each of the spots is comprised of a central portion in the form of a dot and a series of annular portions of increasing peripheries surrounding said dot; making a single exposure on the photoresist coated material by simultaneously using said continuous tone transparency of the artwork and the contact screen, and processing and etching the exposed photoresist coated material.

5. A method of making a stencil for halftone printing, said method comprising the steps of making a contact screen by superimposing a plurality of translucent dot patterns of varying shapes so as to form a unit cell, creating a multiple series of images of said unit cell on photosensitive material, developing said photosensitive material; selecting an etchable material for said stencil, coating said material with an appropriate photoresist; making a continuous tone transparency of the artwork which is to be reproduced; making a halftone transparency using the continuous tone transparency of the artwork and the contact screen; making an exposure on the photoresist coated material through halftone transparency, and processing and etching the exposed photoresist coated material.

6. A method of making a stencil for halftone printing, said method comprising the steps of uniformly exposing and developing sheets of film to obtain uniform sheets of predetermined optical densities, forming a series of different dot shapes from said sheets of film, superimposing said different dot shapes to form a unit cell, exposing photosensitive film with a series of images of said unit cell, and developing said photosensitive film; selecting an etchable material for said stencil, coating said material with an appropriate photoresist; making a continuous tone transparency of the artwork which is to be reproduced, making a halftone transparency using the continuous tone transparency of the artwork and the contact screen; exposing the photoresist coated material with an image of the halftone transparency, and processing and etching the exposed photoresist coated material.

7. A method of making a stencil for halftone printing, said method comprising the steps of superimposing a plurality of varying dot shapes in registered alignment so as to form a unit cell, creating images of said unit cell on photosensitive material, developing said photosensitive material to produce a contact screen having a pattern of dots thereon wherein each dot has a gradation of shading from its central portion to the periphery thereof; selecting an etchable material for said stencil, coating said material with an appropriate photoresist; making a continuous tone negative, with gamma equal to one, of the artwork which is to be reproduced; making a halftone positive transparency using the continuous tone negative of the artwork and the contact screen; exposing the photoresist coated material with an image of the halftone positive transparency, and processing and etching the exposed photoresist coated material.

8. A method of making a stencil for halftone printing, said method comprising the steps of selecting an etchable material for said stencil, coating said material with an appropriate photoresist; making a continuous tone transparency, with gamma equal to less than one, of the artwork which is to be reproduced; making a halftone transparency using the continuous tone transparency of the artwork and a halftone contact screen; making an exposure on the photoresist coated material through halftone transparency, and processing and etching the exposed photoresist coated material.

9. A method as defined in claim 8 wherein the continuous tone transparency has a gamma just under one-half.

10. A method of making a stencil for halftone printing. said method comprising the steps of selecting an etchable material for said stencil, coating said material with an appropriate photoresist; making a continuous tone transparency, with gamma equal to less than one, of the artwork which is to be reproduced; making an exposure on the photoresist coated material by simultaneously using said continuous tone transparency of the artwork and a halftone contact screen, and processing and etching the exposed photoresist coated material.

11. A method as defined in claim 10 wherein the continuous tone transparency has a gamma just under one-half.

12. A method as defined in claim 10 wherein said continuous tone transparency is a negative of the artwork.

13. A stencil for halftone printing, said stencil comprising a sheet of material having apertures therethrough, said apertures being spaced to provide a fixed number of apertures per unit of linear measure, and some of said apertures differing from other of said apertures both in size and in shape for providing a tonal range extending from light to dark.

14. A stencil as defined in claim 13 wherein said apertures have a continuous border and define openings capable of allowing passage therethrough of particles having an average diameter between 1 and 25 microns.

15. A self-supporting stencil for halftone printing, said stencil comprising a sheet of material having apertures therethrough, said apertures varying in size and shape and corresponding in size and shape to that of conventional halftone printing dots for providing a tonal range extending from light to dark.

16. In an electrostatic screen printing apparatus for producing halftone prints, a self-supporting stencil, said stencil consisting of a sheet of electrically conductive material having apertures therethrough spaced to provide a fixed number of apertures per unit of linear measure, said apertures having a continuous border and varying in size and shape for providing a tonal range extending from light to dark to produce a desired pattern.

17. In an apparatus as defined in claim 16, said stencil being further characterized in that said apertures are dimensioned so as to allow passage therethrough only of particles having an average diameter of less than 25 microns.

References Cited

UNITED STATES PATENTS

| | | | |
|---|---|---|---|
| 401,510 | 4/1889 | Muller | 96—116 |
| 2,095,015 | 10/1937 | Von Kujawa | 96—116 |
| 2,569,752 | 10/1951 | Fowler | 96—36.4 X |
| 2,811,444 | 10/1957 | Wattier | 96—45 X |

FOREIGN PATENTS

| | | |
|---|---|---|
| 657,908 | 4/1938 | Germany. |

OTHER REFERENCES

Dorst, "A Method of Designing and Making Contact Screens," Research Bulletin, No. 16, 1951, pp. 18–20, 34, 57–60.

ROLAND E. MARTIN, Jr., Primary Examiner

U.S. Cl. X.R.

96—38, 45, 116; 101—128.3